(12) United States Patent
Dowty et al.

(10) Patent No.: US 11,203,433 B2
(45) Date of Patent: Dec. 21, 2021

(54) PREDICTIVE AIRCRAFT PASSENGER CABIN SERVICE SYSTEM AND METHOD

(71) Applicant: B/E Aerospace, Inc., Winston-Salem, NC (US)

(72) Inventors: Mark B. Dowty, Rural Hall, NC (US); Glenn A. Johnson, Rural Hall, NC (US); Kent Kroener, Cooper City, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 335 days.

(21) Appl. No.: 16/526,495

(22) Filed: Jul. 30, 2019

(65) Prior Publication Data

US 2021/0031924 A1 Feb. 4, 2021

(51) Int. Cl.
| | | |
|---|---|---|
| *B64D 11/00* | (2006.01) | |
| *B64F 5/60* | (2017.01) | |
| *G08B 5/00* | (2006.01) | |
| *B60Q 3/00* | (2017.01) | |
| *B60Q 1/00* | (2006.01) | |
| *B60Q 3/30* | (2017.01) | |
| *B60Q 3/40* | (2017.01) | |
| *G08B 5/36* | (2006.01) | |
| *G08B 5/22* | (2006.01) | |

(52) U.S. Cl.
CPC ............ *B64D 11/0015* (2013.01); *B60Q 1/00* (2013.01); *B60Q 3/00* (2013.01); *B60Q 3/30* (2017.02); *B60Q 3/40* (2017.02); *B64F 5/60* (2017.01); *G08B 5/00* (2013.01); *G08B 5/222* (2013.01); *G08B 5/36* (2013.01)

(58) Field of Classification Search
CPC ......... B64D 11/0015; B64F 5/60; B60Q 3/40; B60Q 3/30; B60Q 1/00; B60Q 3/00; G08B 5/00; G08B 5/222; G08B 5/36
See application file for complete search history.

(56) References Cited

U.S. PATENT DOCUMENTS

| | | | |
|---|---|---|---|
| 2009/0108649 A1* | 4/2009 | Kneller | B64D 11/00 297/217.6 |
| 2012/0292986 A1* | 11/2012 | Riedel | B60Q 3/47 307/9.1 |
| 2017/0064067 A1* | 3/2017 | Hockenberry | B64D 11/0015 |
| 2017/0283086 A1* | 10/2017 | Garing | B64D 11/0638 |
| 2017/0289494 A1* | 10/2017 | Garing | G09G 3/002 |
| 2018/0310780 A1* | 11/2018 | Mahaffey | A47K 5/1217 |
| 2019/0112050 A1 | 4/2019 | Ibrahim et al. | |
| 2019/0196475 A1* | 6/2019 | Vandewall | B64D 11/00 |
| 2019/0391581 A1* | 12/2019 | Vardaro | A61B 5/18 |
| 2020/0047639 A1* | 2/2020 | Schevardo | B64D 11/00155 |

* cited by examiner

*Primary Examiner* — Nay Tun
(74) *Attorney, Agent, or Firm* — Suiter Swantz pc llo

(57) ABSTRACT

Systems and methods for monitoring passenger activity in an aircraft cabin environment to predict immediate future passenger needs. The systems and methods make use of sensors positioned within an aircraft cabin environment configured to sense condition changes of objects corresponding to predetermined service issues, device(s) usable by the service crew indicating the sensed condition changes, and processing circuitry configured to receive sensor signals and indicate the condition changes through the device(s) such that the service crew is made aware of the condition changes requiring actions to be completed by the service crew to attend to the immediate future passenger needs.

18 Claims, 7 Drawing Sheets

PREDICTIVE AIRCRAFT PASSENGER CABIN SERVICE SYSTEM AND METHOD

BACKGROUND

Air travelers, and particularly those traveling in premium seating classes, have needs that must be attended to by the flight crew. Passenger needs may include, for example, food, drink, privacy, sleep, comfort and technology requests, among others. In conventional airliners, flight crew actions are typically on-demand responsive to individual passenger requests. Requests may be initiated by passengers via verbal communications to the flight crew, service crew call buttons, etc. Such modes of communication have inherent delays in response times because of the ways in which requests are made and processed, the number of outstanding requests, flight crew member availability, flight crew interactions, etc.

For example, a traveling passenger waking from a sleep may have an immediate need for a sitting position change, bedding removal, food or drink. In another example, a traveling passenger finished with a meal may have an immediate need for meal tray and trash removal. In conventional service systems, attention to these needs is provided by the flight crew in response to a passenger-initiated request. Requests must first be noticed by the flight crew before the flight crew can visit the passenger to determine the need before ultimately acting to address the need. Such processes and delays are undesirable to traveling passengers, and particularly those paying premium fares.

To create a more premium travel experience, what is needed is a coordinated and networked system that automates and obviates at least some of the conventional interactions between traveling passengers and flight crew as they relate to passenger needs. A desirable system would be configured to identify, for example, condition changes within the passenger cabin environment and analyze those changes to predict the immediate future needs of passengers. Such a system would allow the flight crew to be proactive in addressing passengers needs as opposed to being reactive as in conventional cabin management systems.

SUMMARY

In one aspect, the inventive concepts disclosed herein are directed to systems for monitoring passenger activity in an aircraft cabin environment to predict immediate future passenger needs. The systems include sensors positionable within an aircraft cabin environment configured to detect condition changes in the aircraft cabin environment corresponding to predetermined service issues, a table stored in a memory of a computer including actions to be completed by service crew members responsive to the predetermined service issues, a device configured to indicate detected condition changes, and processing circuitry communicatively coupled to the sensors, the memory and the device. The processing circuitry is configured to execute a plurality of machine-readable instructions stored in a non-transitory computer readable medium in the computer, wherein the instructions, when executed by the processing circuitry, cause the processing circuitry to receive from the sensors signals indicating condition changes of the objects, indicate through the device the received condition changes of the objects, correlate using the table the condition changes of the objects with the predetermined service issues, retrieve from the table the actions to be completed by the service crew members corresponding to the predetermined service issues, and indicate through the device the actions to be completed by the service crew members responsive to the condition changes of the objects.

In some embodiments, the system further includes individual passenger suites positioned in the aircraft cabin environment, each of the passenger suites including an adjustable passenger seat, a suite door, and at least one suite amenity, wherein the sensors include at least one first sensor operable for sensing a position change of the adjustable passenger seat, at least one second sensor operable for sensing a position change of the suite door, and at least one third sensor operable for sensing a condition change of the at least one suite amenity.

In some embodiments, the device includes a display, wherein the received condition changes are visually displayed on the device, and wherein the actions to be completed by the service crew members are visually displayed on the device.

In some embodiments, the device includes a display and the device is configured to visually display a virtual floorplan of the aircraft cabin environment including individual passenger suites, wherein the objects are associated with at least one of seats, furniture, amenities and passengers within or part of the individual passenger suites, and wherein condition changes of the objects are visually displayed on the virtual floorplan in real-time.

In some embodiments, the device is a wall-mounted display positionable in a crew service area within the aircraft cabin environment.

In some embodiments, the device is a handheld device including a display, a display positionable in a crew service area, or a wearable device.

In some embodiments, the sensors include one or more of visual sensors, position sensors, and status sensors.

In some embodiments, the processor is further configured to reconcile received condition changes of objects with predetermined time values associated with the predetermined service issues, such that time values exceeding predetermined time values cause the processor to indicate, through the device, the received condition changes of the objects, and time values less than the predetermined time values cause the processor not to indicate, through the device, the received condition changes of the objects.

In some embodiments, the processor is further configured to confirm, through the device, that an action to be completed by the service crew members responsive to the condition changes of the objects has been completed, and record, in the memory of the computer, responsiveness criteria of the service crew members associated with the actions to be completed by the service crew members.

In some embodiments, the processor is further configured to communicate with a passenger manifest including passenger preferences and modify the condition changes of the objects according to the passenger preferences.

In another aspect, the inventive concepts disclosed herein are directed to a system for monitoring passenger activity in an aircraft cabin environment. The system includes sensors positionable within an aircraft cabin environment configured to detect condition changes of objects positioned in the aircraft cabin environment, the condition changes corresponding to predetermined service issues predictive of immediate future passenger needs, a device configured to indicate detected condition changes of the objects, and processing circuitry communicatively coupled to the sensors and the device. The processing circuitry is configured to execute a plurality of machine-readable instructions stored in a non-transitory computer readable medium in a computer, wherein the instructions, when executed by the processing circuitry, cause the processing circuitry to receive, from the sensors, signals indicating condition changes of the objects, and indicate, through the device, the received condition changes of the objects to alert the service crew of the condition changes of the objects.

In some embodiments, the processing circuitry is further configured to correlate using a table the condition changes of the objects with the predetermined service issues, retrieve from the table actions to be completed by the service crew members responsive to the predetermined service issues, and indicate through the device the actions to be completed by the service crew members responsive to the condition changes of the objects.

In some embodiments, the system further includes passenger suites positioned in the aircraft cabin environment, each of the passenger suites including an adjustable passenger seat, a suite door, and at least one suite amenity, wherein the sensors include at least one first sensor operable for sensing a position change of the adjustable passenger seat, at least one second sensor operable for sensing a position change of the suite door, and at least one third sensor operable for sensing a condition change of the at least one suite amenity.

In some embodiments, the processor is further configured to reconcile received condition changes of objects with predetermined time values associated with the predetermined service issues, such that time values exceeding predetermined firms values cause the processor to indicate, through the device, the received condition changes of the objects, and time values less than the predetermined time values cause the processor not to indicate, through the device, the received condition changes of the objects.

In some embodiments, the processor if further configured to at least one of confirm through the device that an action to be completed by the service crew members responsive to the condition changes of the objects has been completed, record responsiveness criteria of the service crew members associated with the actions to be completed by the service crew members, and communicate with a passenger manifest including passenger preferences and modify the condition changes of the objects according to the passenger preferences.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

The inventive concepts are described hereinafter with reference to the accompanying drawings in which exemplary embodiments are shown. However, the inventive concepts may be embodied in many different forms and should not be construed as limited to the representative embodiments set forth herein.

Disclosed herein are coordinated and networked systems and methods utilizing various sensor types, networks, interpretive processes and visual capture methods to analyze and predict the immediate future needs of passengers. Immediate future needs may be, for example, predicted needs associated with a condition change such as a passenger, object, environment or activity change. Immediate future needs may be correlated with predetermined flight crew actions responsive to the condition changes within the passenger cabin environment. Data within the networked system may be streamed from sensors and sensor networks positioned in the aircraft cabin environment, for example, within or in proximity to seats, suites, lavatories, furniture and other objects. Sensors may monitor object movements such as position and geometry changes and may communicate with other sensors in the system such as those associated with seat actuation or other strategically positioned sensors. Sensing may also include streaming passenger location positioning using image processing and a sensor or an array of sensors.

Figure 1:
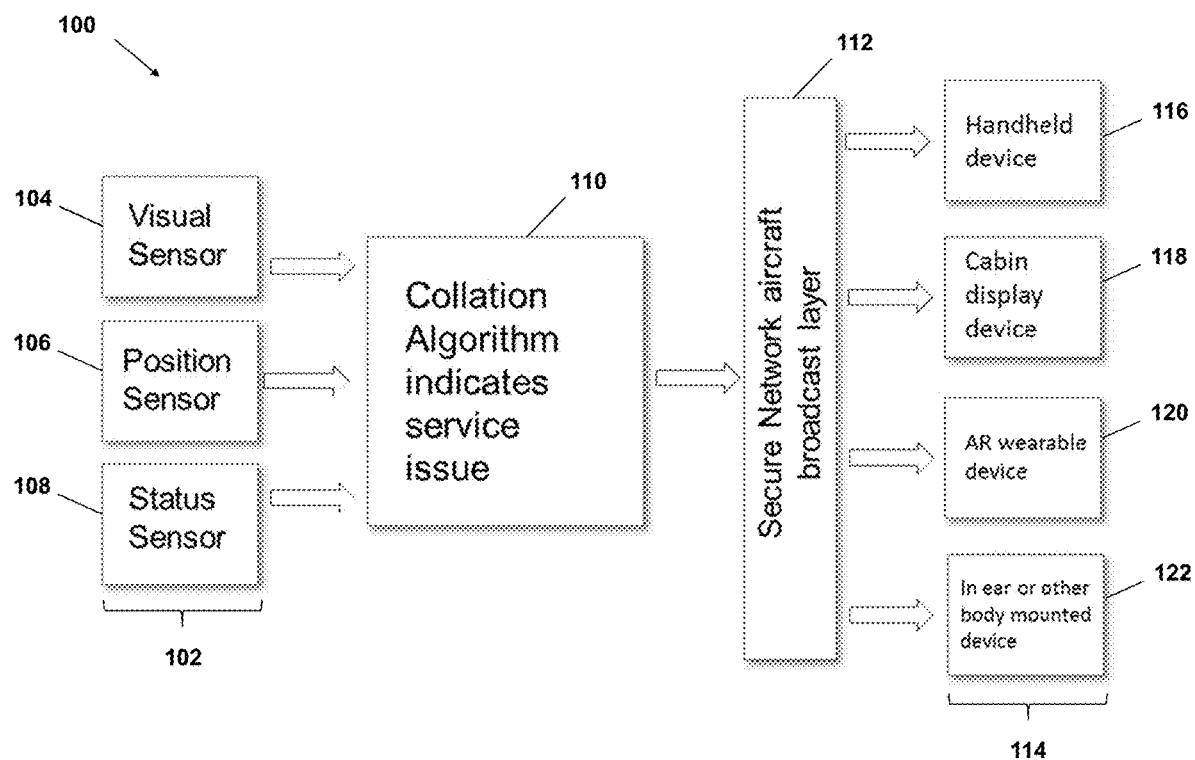
FIG. 1 is a block diagram illustrating a first configuration of a predictive cabin service system according to the present disclosure.

FIG. 1 depicts a first configuration of a predictive cabin service system generally at reference numeral 100. Aboard an aircraft, sensors 102 of one or more sensor networks are positioned within the aircraft cabin environment. For example, sensor networks may be positioned in relation to and associated with one or more of passenger seats, passenger suites, lavatories, overhead stowage bins, closets, amenities, furniture, electronic equipment, etc. Sensor networks may also be positioned in relation to predetermined areas to be monitored within the passenger cabin environment. Each sensor, sensor array or sensor network is configured to sense a condition change within the aircraft cabin environment. Condition changes may include, but are not limited to, object movements, passenger movements, environmental changes, activity changes, equipment changes, etc. Each condition change to be monitored determines the type(s) of sensor, sensor array and sensor network required.

Sensors utilized in the systems according to the present disclosure may include, but are not limited to, acoustic sensors, chemical sensors, electrical sensors, environmental sensors, position sensors, optical sensors, pressure sensors, force sensors, temperature sensors, and proximity sensors. Acoustic sensors may be utilized to detect noise levels in a predetermined area of the aircraft cabin environment, such as within an individual passenger suite, for device control, comfort, privacy, etc. Chemical sensors may be utilized to monitor the environment. Electrical sensors may be utilized to detect electrical equipment status or mode changes, or may be electrically coupled with seat control systems to monitor condition changes corresponding to technology needs, comfort, etc. Environmental sensors may be utilized to monitor discrete sections of the aircraft cabin environment and may be coordinated with other local sensor systems. Temperature sensors may be utilized to predict passenger comfort needs. The remaining sensor types may be utilized, for example, to detect position and geometry changes in the aircraft cabin environment to predict all types of passenger needs.

A variety of sensors may be mounted onto or within objects to monitor position. For example, a gyroscopic sensor or gyro sensor may be used to identify the orientation of an object including the sensor. An orientation sensor provides information regarding position in comparison to a reference plane. Examples of orientation sensors include rotary encoders and inclinometers. A Hall effect sensor may be used to determine proximity to a magnetic field, which can be translated to a range of positions. Other proximity sensors include optical, capacitive, and inductive proximity sensors. In a simpler embodiment, a reed switch is opened or closed by a magnetic field, such that a binary position (e.g., in this orientation, not in this orientation) may be readily determined based upon a switch position. In another simple embodiment, an optical switch may be used to determine whether a beam of light has been broken, which can translate to whether a certain object is in a particular position or not.

As shown in FIG. 1, sensors utilized in the exemplary system shown may include sensors of the above types such as visual sensors 104, position sensors 106, and status sensors 108. Each sensor may be a device or a subsystem capable of detecting condition changes within the aircraft cabin environment and communicating with a processor 110. For example, visual sensors 104 may detect objects and/or passengers to detect presence or absence and to track movements. Position sensors 106 may detect positional or geometry changes of objects. Status sensors 108 may detect operational modes or status of devices.

The system sensors 102 relay information to the system processor 110 where processing logic analyzes the data received to confirm service issues corresponding to predictive actions. The processor 110 may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor 110 is a hardware device for executing software instructions such as collation algorithms. The processor 110 may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the sensors 102, an aircraft network 112, and flight crew devices 114. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface may be used to enable the server to communicate on a network, such as the Internet, a wide area network (WAN), a local area network (LAN) such as the secure aircraft network 112, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The flight crew devices 114 may be digital devices that, in terms of hardware architecture, include a processor, input/output (I/O) interfaces, a data store, a memory and a display. For example, the flight crew devices 114 may include one or more of mobile handheld devices 116, centrally located cabin display devices 118, wearable devices 120, and in-ear or other body mounted devices 122. The active system may include one or more of these device types to ensure that the flight crew is made aware of, by redundant communications to the various devices, indicated service issues in a timely manner to minimize response time delays. Mobile flight crew devices may be enabled for wireless communication to an external access device or network. The data store may be used to store data. The memory may include any of volatile memory elements, nonvolatile memory elements, and combinations thereof. Programs can include an application or "app" which provides various functionality.

Upon activation of the system 100, and with at least one sensor 102 in an active sensing mode, condition changes are monitored and information conveyed to the processor 110. The main routine of the processor 110 operates to receive and analyze the condition changes to determine the occurrence of a qualifying condition change corresponding to a predetermined service issue. Predetermined service issues are correlated to actions to be considered or performed on the part of the flight crew to attend to a potential passenger need. The processor 110 may communicate with a look-up table stored in the sever memory containing the list of qualifying condition changes and responsive actions. Upon confirmation of a qualifying service issue, the processor operates to send an instruction to one or more of the flight crew devices 116 to cause the one or more devices to display at least one of the condition change, service issue, and predetermined flight crew actions responsive to the service issue.

Flight crew actions are actions to be considered, and more likely actions to be performed by the flight crew responsive to an indicated service issue. Flight crew actions may be stored on the look-up table corresponding to the service issues and condition changes. In some embodiments, the flight crew actions are pre-programmed and predetermined. In some embodiments, the flight crew may have the ability to modify the flight crew actions, through the flight crew devices 116 or another avenue, based on passenger preferences and historical data. For example, a passenger may desire a specific flight crew action, different from the pre-programmed action(s), responsive to a particular service issue. In the case of preferences, modifications can be made or notes can be added to the look-up table specific for that traveling passenger in embodiments in which the look-up table is modifiable. Modifications may be stored in memory and tagged or otherwise associated with passenger information by way of name, frequent flyer number or other passenger identifier, to better serve a passenger for the remainder of the flight and on future flights.

Figure 2:
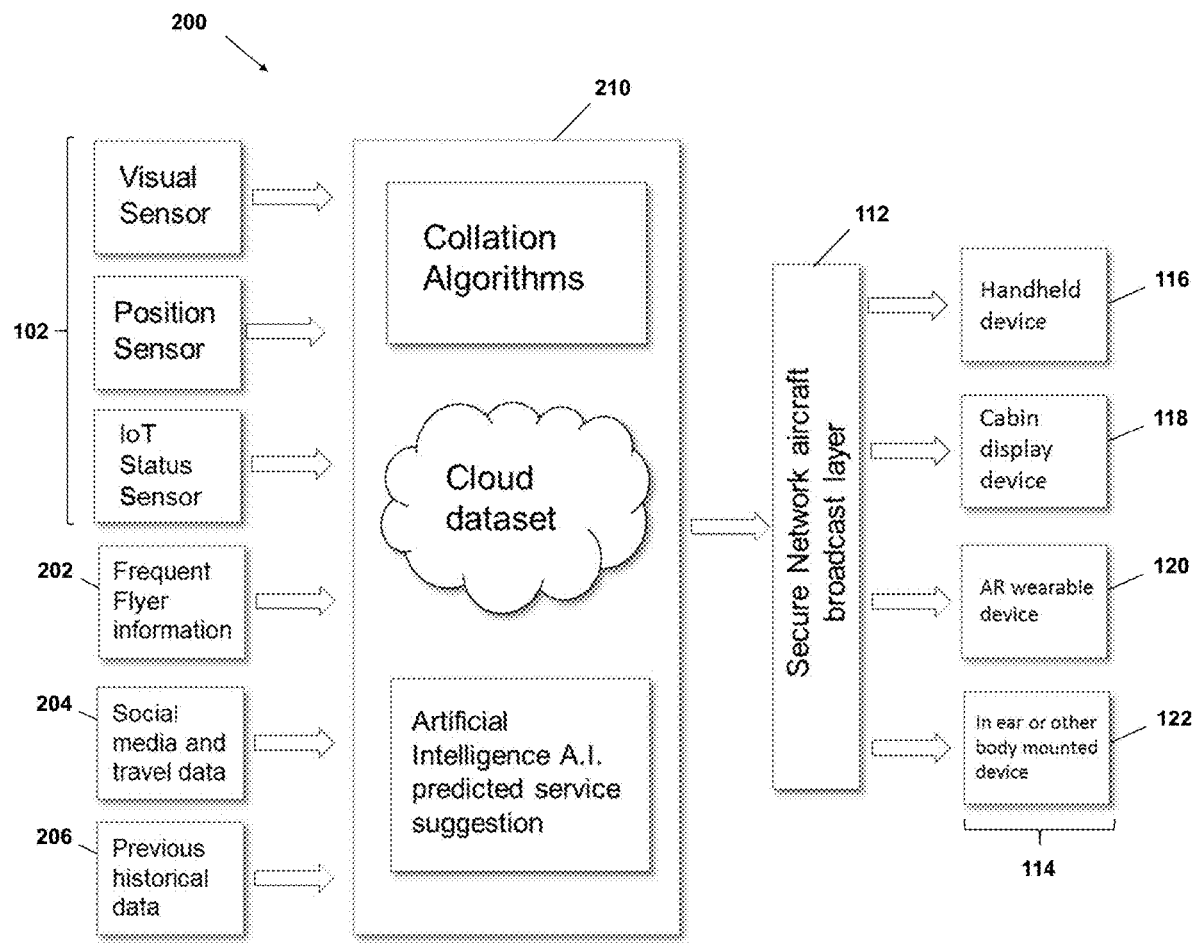
FIG. 2 is a block diagram illustrating a second configuration of a predictive cabin service system according to the present disclosure.

FIG. 2 depicts a second configuration of a predictive cabin service system generally at reference numeral 200. Like the first system 100, the second system 200 includes sensors 102, a processor 210, a secure aircraft network 112, and one or more flight crew devices 114. The second system 200 further includes information or access to one or more of frequent flyer information 202, social media and travel data 204, and previous historical data 206 such as flight crew notations and modifications. The processing logic is further configured to access one or more of the additional information sources to potentially modify the indication or the flight crew action(s). In some embodiments, a passenger manifest may be used to update the look-up table with passenger preferences to modify one or more of the indications and flight crew actions. For example, while one passenger may typically desire food or beverage attention immediately after waking from a sleep, a different passenger may prefer not to be disturbed for a predetermined period of time after waking. While a default setting may be a flight crew action to attend to a passenger within a short time period, a preference setting may be used to set or indicate a delay to a flight crew action. The external information sources including the frequent flyer information 202, social media information 204, and previous historical data 206 may be factors for correlating or modifying flight crew actions. In some embodiments, the system may be configured with a form fillable by passengers to set specific preferences, wherein the processing logic is configured to process the forms and update indications or actions based on the passenger preferences.

Figure 3:
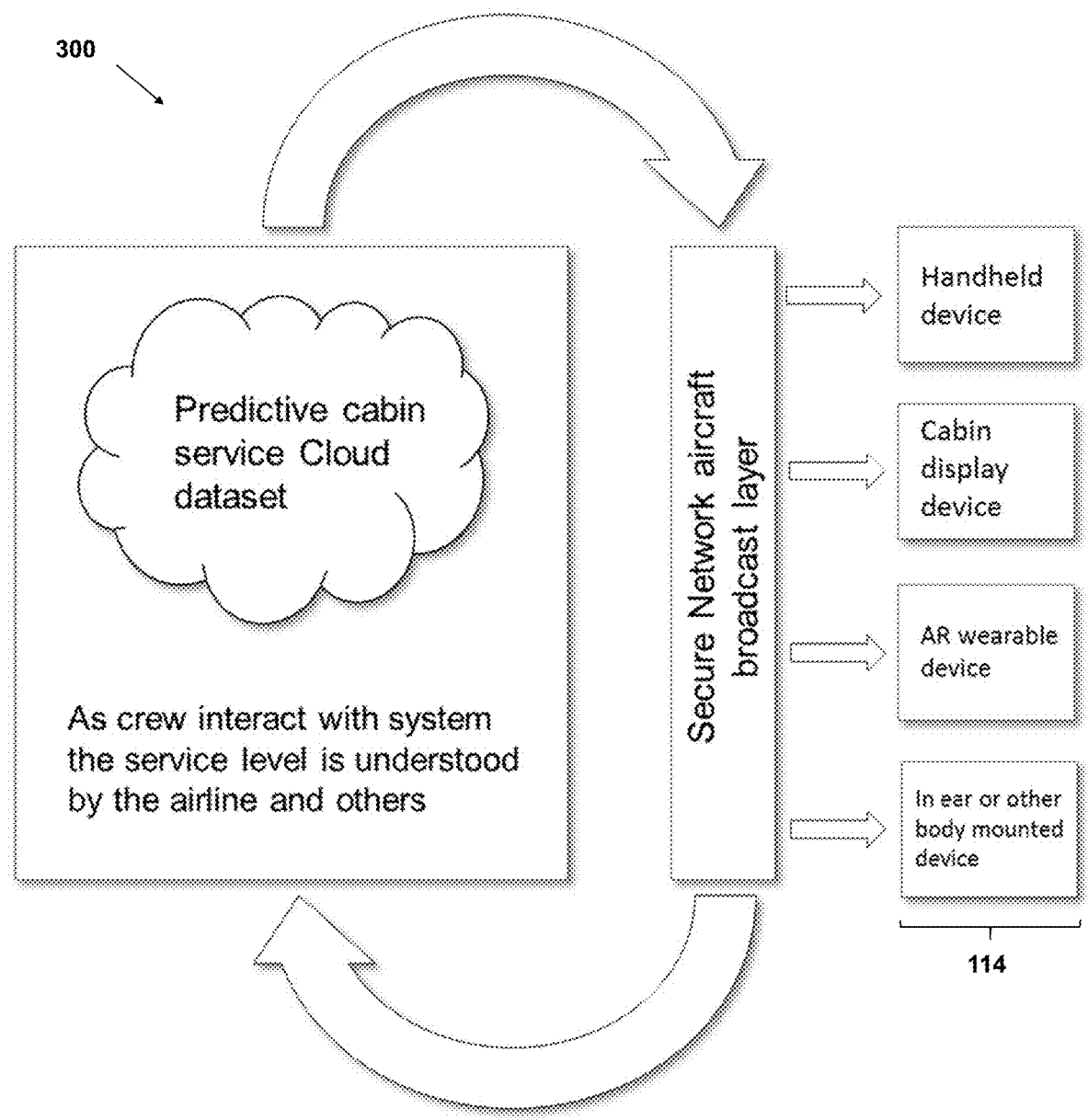
FIG. 3 is a block diagram illustrating a feedback loop associated with the predictive cabin service system embodiments according to the present disclosure.

FIG. 3 depicts a feedback loop sub-routine 300 executable by the processor (110, 210). In the sub-routine 300, the flight crew and/or the passengers may interact, manually or automatically, with the system (100, 200) to provide feedback to the airline. Feedback may include responsive to indications, response times, passenger satisfaction, etc. The feedback loop sub-routine may be a component of the system (100, 200) executable by the processor, or may a separate subsystem. In some embodiments, the flight crew may be tasked with entering or confirming a response to an indicated service issue via one of the flight crew devices 114, such that response time and response action can be measured, gauged and reported for quality control or other purposes. In some embodiments, the system may be remotely accessed by passengers post-flight for passenger feedback for quality control.

In a passenger suite or like environment according to the present disclosure, there may be several systems and subsystems utilized to create a premium travel experience. For example, each seat itself may include an articulating sitting mechanism that supports a cushioned seat bottom, backrest, leg rest and headrest. Embedded in this adjustable mechanism may be touch interfaces, motors and actuators that move the overall seat from sitting to bed through intermediate lounge positions. Such mechanisms may utilize sensors in connection with power, position, orientation and status. Other systems and subsystems may be utilized in surrounding furniture and stowage. For example, doors, tray tables and various stowages may move or have moving components such as lids and doors. Sensor systems and subsystems may be embedded in these mechanical objects for wired or wireless communication with the system. Electronic equipment such as in-flight entertainment equipment (IFE) may also be equipped with sensors and incorporate software that reacts to inputs. Not limited to seats, furniture, mechanical objects, electronics and the immediate surrounding environment, there may be other areas within the aircraft passenger cabin environment in which the predictive cabin service system operates to sense condition changes to alert the flight crew to attend to a service issue.

Figure 4:
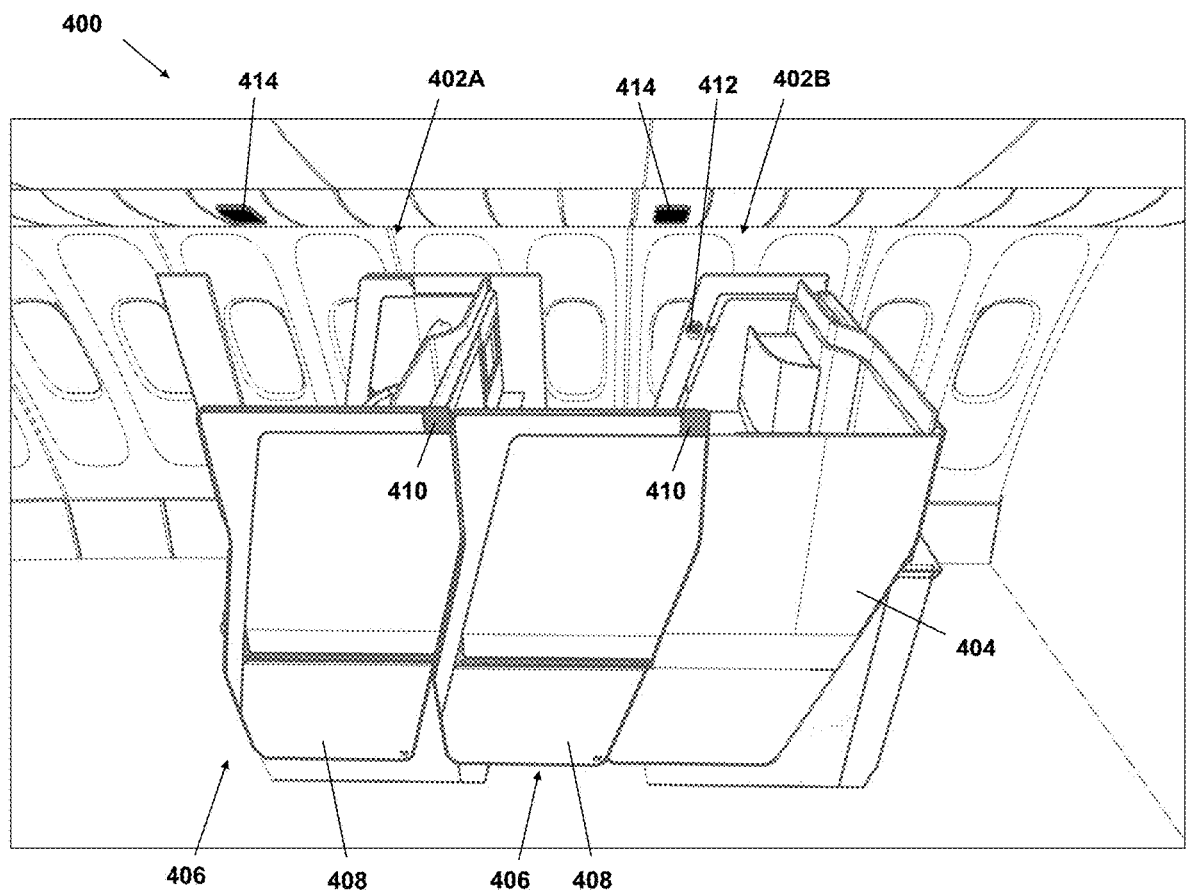
FIG. 4 illustrates sensor networks configured to sense condition changes associated with aspects of individual passenger suites in an aircraft passenger cabin environment.

In a first exemplary implementation of the systems according to the present disclosure, FIG. 4 depicts a portion of an aircraft passenger cabin environment 400 including a layout of individual passenger suites 402A, 402B in a repeat one in front of the other. Each passenger suite 402A, 402B is generally defined by one or more privacy walls 404. Each passenger suite 402A, 402B has direct aisle access through an entrance 406 formed by a break in the privacy walls 404 or between spaced privacy walls of longitudinally adjacent suites. The entrance 406 can be opened or closed utilizing a moveable door 408 such as a sliding door configured to slide along rails. As shown in FIG. 4, the door 408 of the forward suite 402A is shown open allowing access into the forward suite, while the door 408 of the aft suite 402B is shown closed blocking access into the aft suite. Each suite further includes an adjustable seat and amenities positioned within the suite interior.

Networked sensors are embedded in one or more of the seat, seat surrounds, and in adjacent locations to sense condition changes such as position changes and passenger movements. In some embodiments, a first subset of sensors includes position sensors configured to sense condition changes including door movements. Each individual suite 402A, 402B may be equipped with position sensors configured to obtain position measurements of the doors, either absolute or relative. For example, a sensor 410 may be located on the door 408 and a counterpart sensor may be located on a surround or stationary privacy wall. The sensors may be contact or non-contact sensors and a position change of one sensor relative to the other in a first direction may indicate door closing movement, while a position change of one sensor relative to the other in a second direction opposite the first direction may indicate door opening movement. Other sensor arrangements including single sensors such as proximity sensor may be utilized. The aircraft passenger cabin environment 400 may further include a second subset of sensors 412 configured to sense seat or passenger movement. The sensors of the second subset of sensors 412 may include, for example, infra-red, video or like sensors for visual capture of objects. In one embodiment, door opening movement may trigger a sensor of the first subset, and the seat moving to an upright sitting position may trigger a sensor of the second subset, and the system may coordinate sensor outputs from the two subset to indicate a service issue to the flight crew.

The aircraft passenger cabin environment 400 may further include a third subset of sensors 414 located in the ceiling above the passenger suites 402A, 402B. Each sensor 414 may be configured to monitor the suite, a specific object within the suite, the passenger, or the suite environment utilizing one or more of position, vision, chemical and environmental sensors.

Figure 5A:
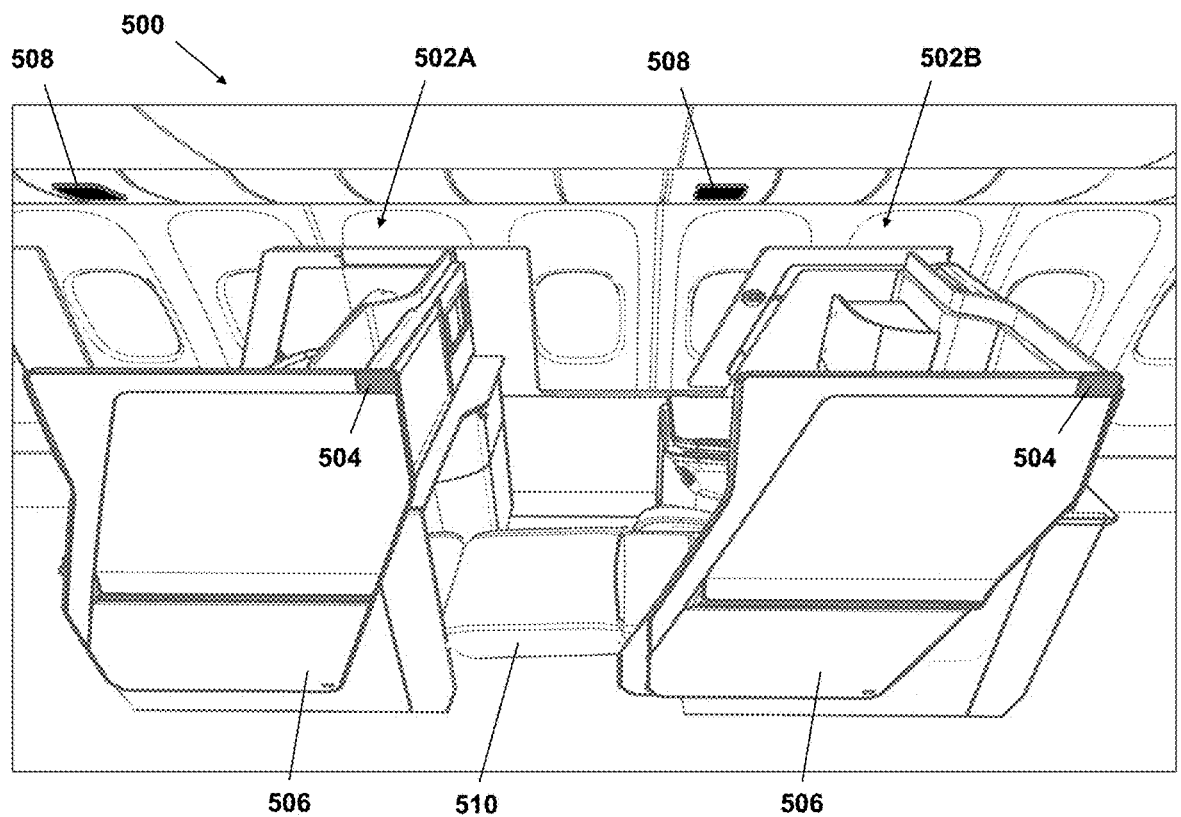
FIGS. 5A and 5B illustrate sensor networks configured to sense condition changes associated with passenger seats, suite doors and the environment of passenger suites in an aircraft passenger cabin environment.
Figure 5B:
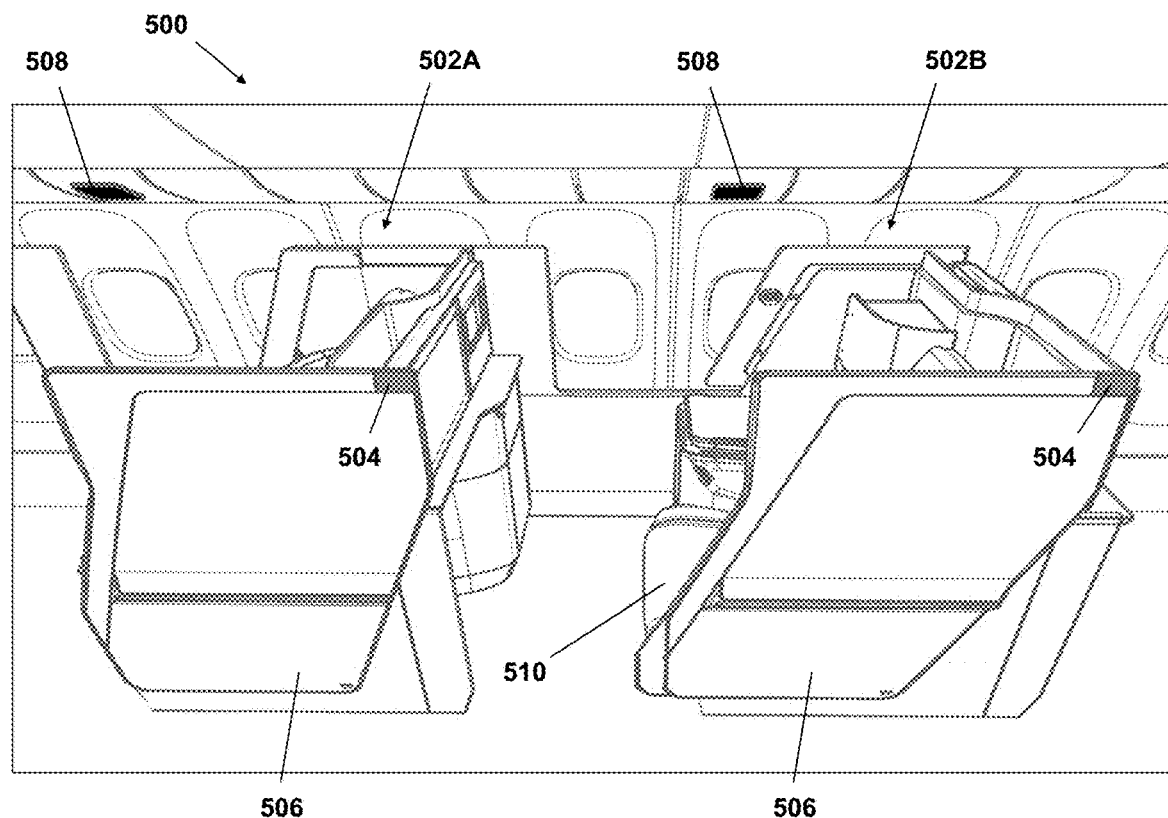

In another exemplary implementation of the systems according to the present disclosure, FIGS. 5A and 5B depict a portion of an aircraft passenger cabin environment 500 including a layout of individual passenger suites 502A, 502B. A first subset of sensors 504 may be positioned to sense condition changes of the suite doors 506 such as door opening and closing, which may be condition changes indicating predetermined service issues linked with responsive actions to be completed by the flight crew. The first subset of sensors 504 may also be used to indicate door position and latching to comply with TTOL requirements. A second subset of sensors 508 may be located in the ceiling and may include one or more of environmental, chemical and visual sensors configured to monitor one or more of passenger movements, object movements, environmental conditions, etc. A third subset of sensors is configured to monitor positional information associated with the passenger seats 510 to sense sitting position condition changes. The sensors may operate on their own or may communicate with strategically positioned sensors such as those associated with the seat actuators. A change in sitting position from lie-flat as shown in FIG. 5A to upright sitting as shown in FIG. 5B is a condition change indicating that a passenger that was asleep is now awake and thus may have a need to be attended to. The condition change is indicated to the flight crew through one of the flight crew devices to identify the service issue such that responsive action can be taken.

The processing logic may coordinate the various sensor subsystems within the aircraft cabin environment. In some embodiments, the collation algorithm may gather the condition change information from one or more subsystems and compare that information against predetermined criteria such as time intervals. For example, a seat condition change from lie-flat to upright after a predetermined time interval has passed may likely indicate that a sleeping passenger has awoken so the flight crew can anticipate a service need of the waking passenger such as food, drink, bedding removal, etc.

In comparison, a seat condition change from lie-flat to upright before a predetermined time interval has passed may indicate a passenger attempted to sleep but could not and therefore a different service need from the flight crew such as more comfort. Sensor subsystems may be networked. For example, condition changes associated with a suite door closing, the seat moved from lounge to bed, and the in-flight entertainment system (IFE) darkened or turned off may be collected, analyzed and compared to determine a passenger is preparing to sleep such that the system can alert the flight crew to the same.

Figure 6A:
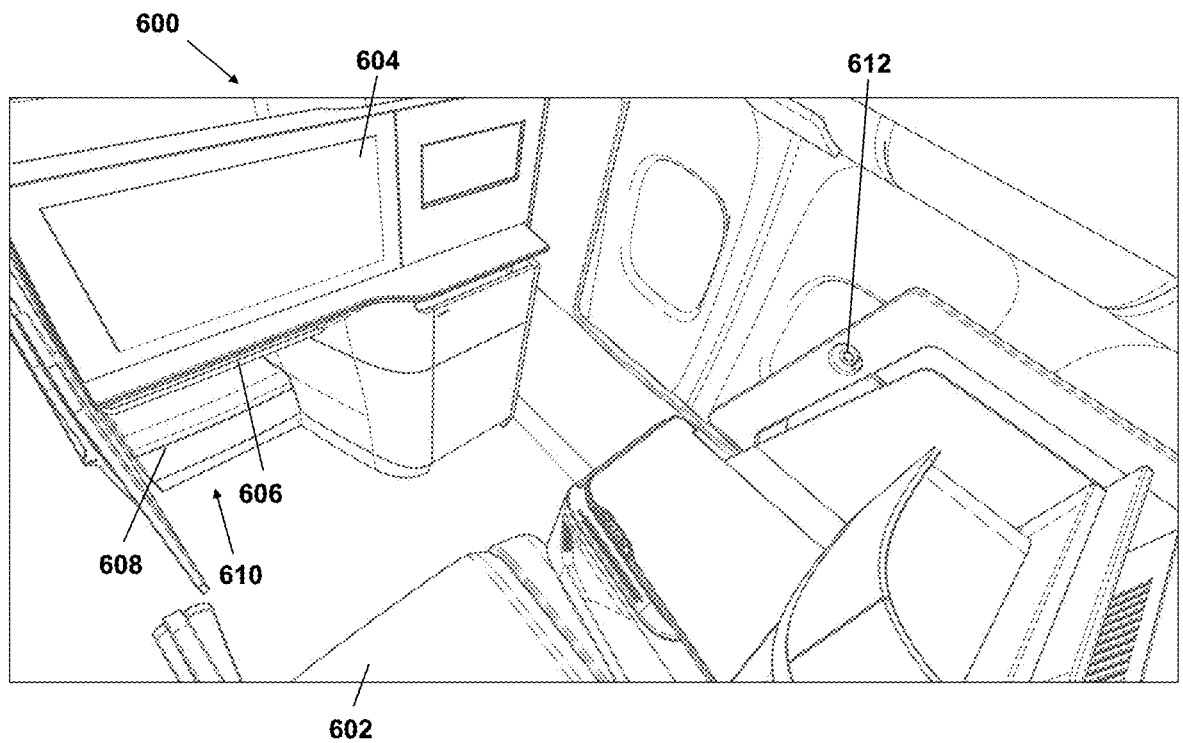
FIGS. 6A and 6B illustrate sensor networks configured to sense position changes associated with a tray table in an aircraft passenger suite.
Figure 6B:
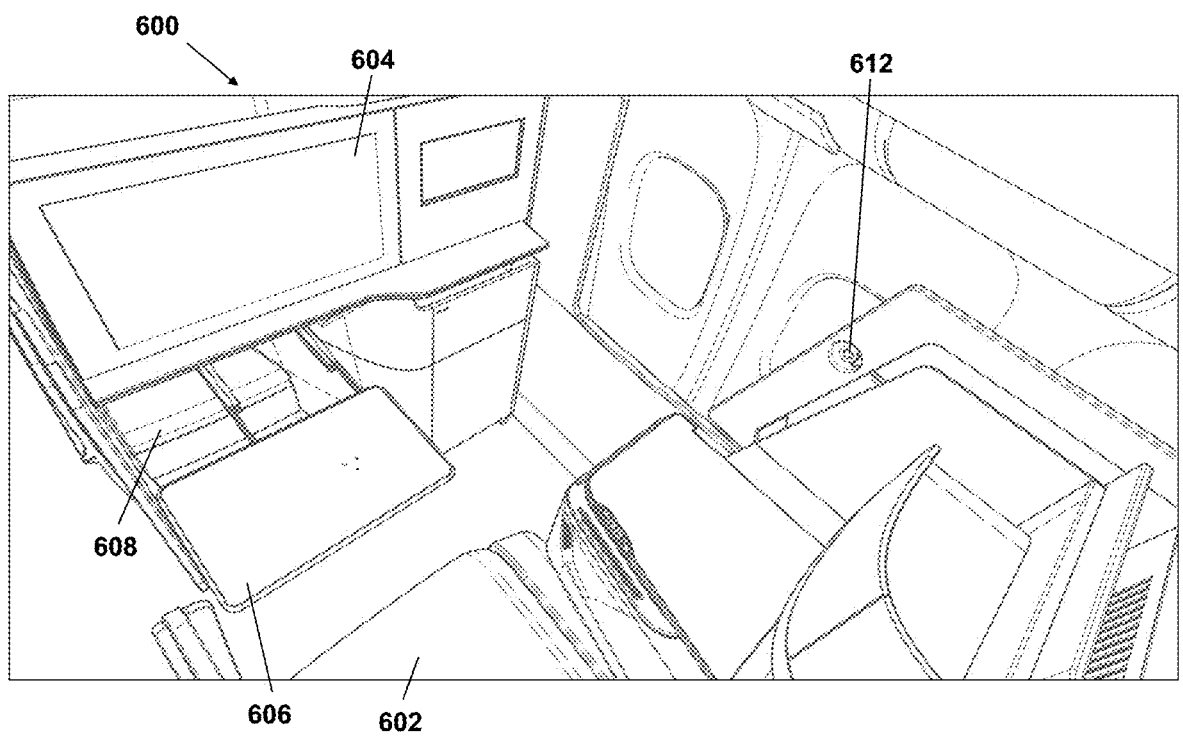

In another exemplary implementation of the systems according to the present disclosure, FIGS. 6A and 6B depict a portion of the interior of an individual aircraft passenger suite 600. Each passenger suite 600 generally includes an adjustable passenger seat 602, a video monitor 604 positioned forward of the seat 602, and a tray table 606 deployable from beneath the video monitor 604. The seat 602 may transition to meet an ottoman 608 located in a footwell 610 below the tray table 606 to increase the bed length. A first sensor network senses condition changes associated with the tray table 606, and specifically, positional changes of the tray table. The positional changes may correspond to tray table movements, in this case lateral movements toward or away from the seat 602 which correspond to deployment or stowage directions of the tray table. For example, a passenger may actuate movement of the tray table 606 toward themselves to indicate their desire to dine or use the table for another purpose and may actuate movement of the tray table 606 away from themselves to indicate they are finished dining and desire dinnerware and trash removal. In some embodiments, the system may be configured to show the position of the tray table 606 at movement direction in real-time to alert the flight crew for anticipatory services. In some embodiments, a visual sensor 612 may be located within the suite proximate the seat to sense passenger actions corresponding to sensed condition changes. To satisfy privacy concerns, the sensor may not capture and record video.

Upon collection and analyzation of the sensed condition changes, the processing logic causes the processor to send instructions to one or more of the flight crew devices to alert the flight crew of service issues. Alerts may be in the form of visual alerts, audio alerts and combinations thereof. Alerts may highlight a condition change associated with an object essentially in real-time. Alerts may be accompanied by suggested flight crew actions responsive to the particular service issue(s). In some embodiments, alerts may require a response from the flight to confirm receipt of the alert.

Figure 7A:
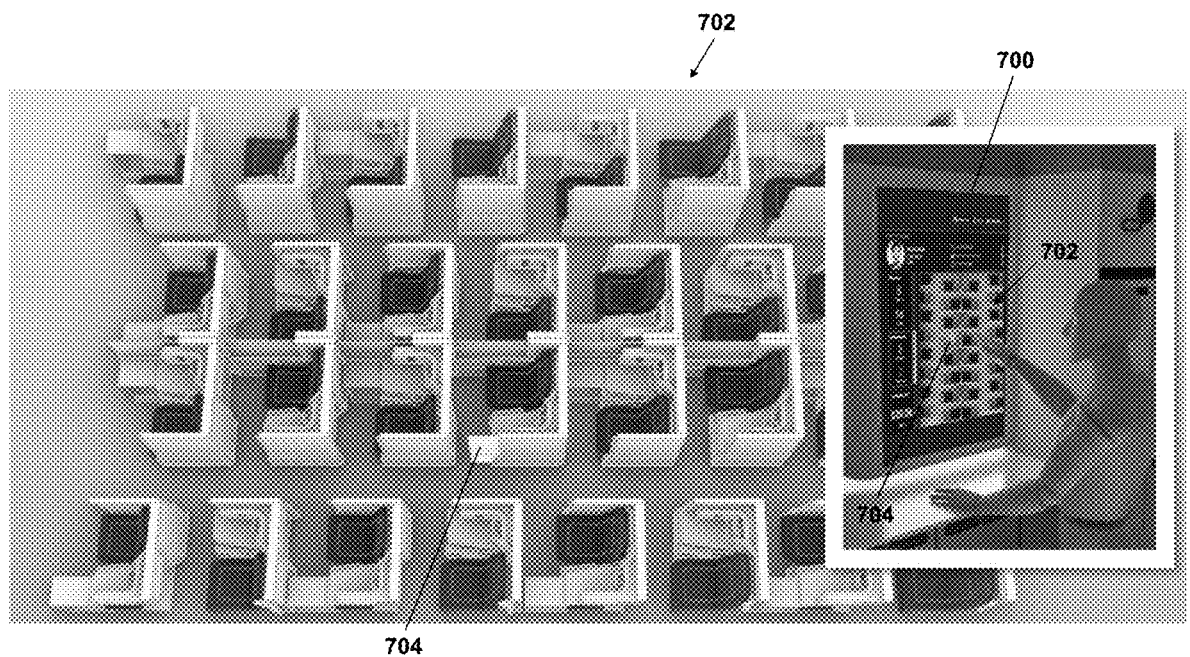
FIGS. 7A and 7B illustrate a virtual floorplan of an aircraft passenger cabin environment displaying respective condition changes associated with a suite door and tray table on a centrally located cabin display panel and a member of the flight crew interacting with the same.
Figure 7B:
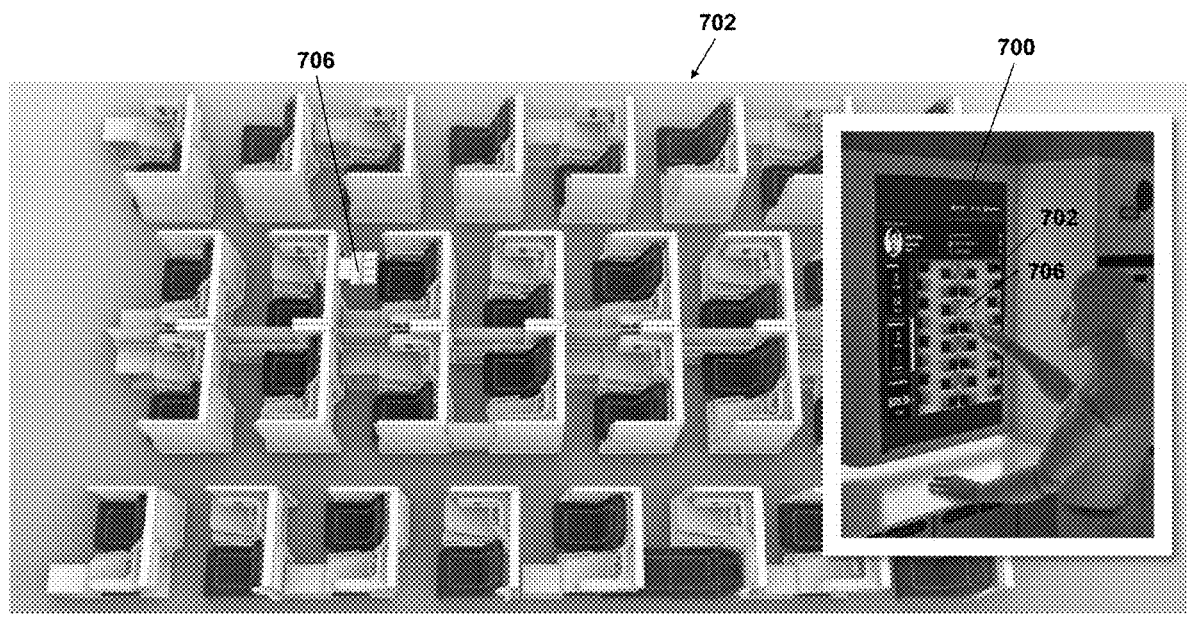

In an exemplary implementation of the system, FIGS. 7A and 7B show a service panel 700 located in a centrally located area accessible to the flight crew. For example, the service panel 700 may be in a galley area assigned to a seating class. Each seating class (e.g., first class, business class, coach class) may include its own service panel for flight crew usage. As shown, the service panel 700 includes a display such as a graphical user interface (GUI) configured to display a virtual floorplan 702 of the seating class. The service panel 700 may be a touchscreen interface. Additional information may be displayed simultaneously with the floorplan 702 including user information, number of active service issues, service issue priority, suggested responsive actions, and other information.

The virtual floorplan 702 displays the layout of passenger suites and real-time positions of the objects monitored for condition changes. An object in the process of a condition change, or an object having recently undergone a condition change, may be highlighted on the virtual floorplan 702 to indicate to the flight crew the service issue and service issue location. For example, FIG. 7A shows a suite door 704 undergoing a condition change (e.g., opening or closing) as a highlighted feature on the virtual floorplan 702 to alert the flight crew. FIG. 7B shows a tray table 706 undergoing or having recently undergone a condition change (e.g., stowed to deployed or vice versa) and the tray table highlighted on the virtual floorplan 700.

In addition to predicting and attending to passenger needs, the cabin service system according to the present disclosure may facilitate preparation for take-off and landing by alerting the flight crew to nonconforming issues and positions. The cabin service system may further utilize the networked sensors to detect objects unintentionally left behind during deplaning. The cabin service system may further utilize the networked sensors to provide an indication of when items are not operating properly and require repair or replacement.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A system for monitoring passenger activity in an aircraft cabin environment to predict immediate future passenger needs, the system comprising:
   sensors positionable within an aircraft cabin environment configured to detect condition changes of objects positioned in the aircraft cabin environment, the condition changes corresponding to predetermined service issues;
   a table stored in a memory of a computer, the table including actions to be completed by service crew members responsive to the predetermined service issues;
   a device configured to indicate detected condition changes of the objects;
   processing circuitry communicatively coupled to the sensors, the memory and the device, the processing circuitry configured to execute a plurality of machine-readable instructions stored in a non-transitory computer readable medium in the computer, wherein the instructions, when executed by the processing circuitry, cause the processing circuitry to: receive, from the sensors, signals indicating condition changes of the objects; indicate, through the device, the received condition changes of the objects; correlate, using the table, the condition changes of the objects with the predetermined service issues; retrieve, from the table, the actions to be completed by the service crew members corresponding to the predetermined service issues; and indicate, through the device, the actions to be completed by the service crew members responsive to the condition changes of the objects; and
   passenger suites positioned in the aircraft cabin environment, each of the passenger suites including an adjustable passenger seat, a suite door, and at least one suite amenity, wherein the sensors include at least one first sensor operable for sensing a position change of the adjustable passenger seat, at least one second sensor operable for sensing a position change of the suite door, and at least one third sensor operable for sensing a condition change of the at least one suite amenity.

2. The system according to claim 1, wherein the device includes a display, wherein the received condition changes are visually displayed on the device, and wherein the actions to be completed by the service crew members are visually displayed on the device.

3. The system according to claim 1, wherein the device includes a display and the device is configured to visually display a virtual floorplan of the aircraft cabin environment including individual passenger suites, wherein the objects are associated with at least one of seats, furniture, amenities and passengers within or part of the individual passenger suites, and wherein condition changes of the objects are visually displayed on the virtual floorplan in real-time.

4. The system according to claim 3, wherein the device is a wall-mounted display positionable in a crew service area within the aircraft cabin environment.

5. The system according to claim 1, wherein the device is a handheld device including a display, a display positionable in a crew service area, or a wearable device.

6. The system according to claim 1, wherein the sensors include one or more of visual sensors, position sensors, and status sensors.

7. The system according to claim 1, wherein the processor is further configured to reconcile received condition changes of objects with predetermined time values associated with the predetermined service issues, such that time, values exceeding predetermined time values cause the processor to indicate, through the device, the received condition changes of the objects, and time values less than the predetermined time values cause the processor not to indicate, through the device, the received condition changes of the objects.

8. The system according to claim 1, wherein the processor is further configured to:
   confirm, through the device, that an action to be completed by the service crew members responsive to the condition changes of the objects has been completed; and
   record, in the memory of the computer, responsiveness criteria of the service crew members associated with the actions to be completed by the service crew members.

9. The system according to claim 1, wherein the processor is further configured to communicate with a passenger manifest including passenger preferences and modify the condition changes of the objects according to the passenger preferences.

10. A system for monitoring passenger activity in an aircraft cabin environment, the system comprising:
    sensors positionable within an aircraft cabin environment configured to detect condition changes of objects positioned in the aircraft cabin environment, the condition changes corresponding to predetermined service issues predictive of immediate future passenger needs;
    a device configured to indicate detected condition changes of the objects;
    processing circuitry communicatively coupled to the sensors and the device, the processing circuitry configured to execute a plurality of machine-readable instructions stored in a non-transitory computer readable medium in a computer, wherein the instructions, when executed by the processing circuitry, cause the processing circuitry to:
    receive, from the sensors, signals indicating condition changes of the objects; and
    indicate, through the device, the received condition changes of the objects; and
    passenger suites positioned in the aircraft cabin environment, each of the passenger suites including an adjustable passenger seat, a suite door, and at least one suite amenity, wherein the sensors include at least one first sensor operable for sensing a position change of the adjustable passenger seat, at least one second sensor operable for sensing a position change of the suite door, and at least one third sensor operable for sensing a condition change of the at least one suite amenity.

11. The system according to claim 10, wherein the processing circuitry is further configured to:
 correlate, using a table, the condition changes of the objects with the predetermined service issues;
 retrieve, from the table, actions to be completed by the service crew members responsive to the predetermined service issues; and
 indicate, through the device, the actions to be completed by the service crew members responsive to the condition changes of the objects.

12. The system according to claim 10, wherein the device includes a display, wherein the received condition changes are visually displayed on the device, and wherein the actions to be completed by the service crew members are visually displayed on the device.

13. The system according to claim 12, wherein the device is a wall-mounted display positionable in a crew service area within the aircraft cabin environment.

14. The system according to claim 10, wherein the device includes a display and the device is configured to visually display a virtual floorplan of the aircraft cabin environment including individual passenger suites, wherein the objects are associated with at least one of seats, furniture, amenities and passengers within or part of the individual passenger suites, and wherein condition changes of the objects are visually displayed on the virtual floorplan in real-time.

15. The system according to claim 10, wherein the device is a handheld device including a display, a display positionable in a crew service area, or a wearable device.

16. The system according to claim 10, wherein the sensors include one or more of visual sensors, position sensors, and status sensors.

17. The system according to claim 10, wherein the processor is further configured to reconcile received condition changes of objects with predetermined time values associated with the predetermined service issues, such that time values exceeding predetermined time values cause the processor to indicate, through the device, the received condition changes of the objects, and time values less than the predetermined time values cause the processor not to indicate, through the device, the received condition changes of the objects.

18. The system according to claim 10, wherein the processor is further configured to at least one:
 confirm, through the device, that an action to be completed by the service crew members responsive to the condition changes of the objects has been completed;
 record responsiveness criteria of the service crew members associated with the actions to be completed by the service crew members; and
communicate with a passenger manifest including passenger preferences and modify the condition changes of the objects according to the passenger preferences.

* * * * *